Dec. 12, 1933.  E. BADUM  1,939,484
DEEP SEA SUBMARINE CABLE
Filed Aug. 29, 1932
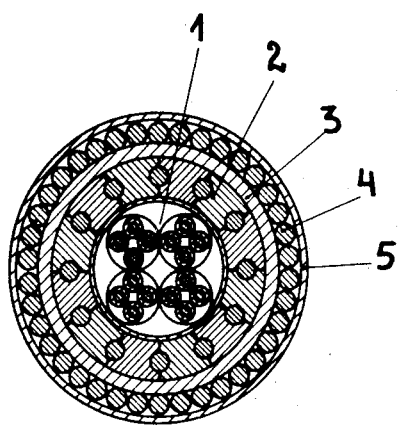
E. Badum
INVENTOR
By: Marks & Clerk
Attys.

UNITED STATES PATENT OFFICE 1,939,484

DEEP SEA SUBMARINE CABLE

Ernst Badum, Ehrenfeld, near Bensberg, Germany, assignor to Felten & Guilleaume Carlswerk Actiengesellschaft, Cologne-Mulheim, Germany Application August 29, 1932, Serial No. 630,959, and in Germany October 6, 1931

3 Claims. (Cl. 173—266)

This invention relates to a deep sea submarine cable, preferably provided with paper and air insulation and having a pressure protecting covering consisting in a known manner, for instance, of one or more layers of profile wires which are stranded together. In order to protect such a cable against the penetration of water, it has been proposed, inter alia, to provide on the pressure protecting covering a comparatively thin layer of water-resistant and impermeable material, instead of the lead sheathing, more particularly gutta-percha and rubber.

According to the present invention the protecting covering impermeable to water, consists, not of gutta-percha and rubber, but of heavy metal salts of high molecular fatty acids (soaps) which are organic water-resistant substances which fuse or melt without decomposition. It has been found that such meltable or fusible organic substances can be used just as well as rubber or gutta-percha for the production of a layer impermeable to water in pressure-protecting cables, being at the same time substantially cheaper than gutta-percha or rubber. In connection therewith, it is also to be pointed out that rubber has to be made water-resistant by a complicated and expensive purification process. Substances which have been found suitable are lead linoleate or copper stearate.

As the substances referred to melt or fuse without decomposition, it is possible to apply them on the pressure-protecting tube in a liquid state, so that special pressure devices and pressing tools such as are required in the manufacture of a lead sheathing need not be used.

The application of the substances referred to is preferably effected in conjunction with one or more layers of fabric. For instance, a layer of the fusible substance is first of all applied to the pressure-protecting tube, then a fabric tape is provided or wound thereon, whereupon a further layer of the protecting material is provided on the said fabric, this being repeated until the layer impermeable to water has reached the desired thickness.

The accompanying drawing illustrates a cable according to the present invention. The cable core 1 consists of four quads with paper- and air-insulation and is surrounded by the pressure-protecting tube 2 on which there is placed a covering 3 of water-resistant organic substances capable of melting without decomposition as above referred to. 4 is the armouring around the said covering 3 and 5 a layer of jute.

What I claim is:—

1. A deep sea submarine cable having a cable core capable of being affected by pressure and water, a pressure protecting tube formed of stranded profile wires surrounding the said cable core and a water-resistant covering impermeable to water on the said pressure protecting tube, which covering consists of a heavy metal salt of a high molecular fatty acid and of fabric layers inserted therein, the said covering serving as the sole water-tight seal for the cable core.

2. A deep sea submarine cable as claimed in claim 1, in which the heavy metal salt of high molecular fatty acids consists of lead linoleate.

3. A deep seat submarine cable as claimed in claim 1, in which the heavy metal salt of high molecular fatty acids consists of copper stearate.

ERNST BADUM.